United States Patent [19]

Steffes

[11] Patent Number: 4,660,898
[45] Date of Patent: Apr. 28, 1987

[54] HYDRAULIC BRAKE SYSTEM WITH SLIP CONTROL

[75] Inventor: Helmut Steffes, Eschborn, Fed. Rep. of Germany

[73] Assignee: ITT Industries Inc., New York, N.Y.

[21] Appl. No.: 660,469

[22] Filed: Oct. 12, 1984

[30] Foreign Application Priority Data

Oct. 21, 1983 [DE] Fed. Rep. of Germany ....... 3338250

[51] Int. Cl.$^4$ .............................................. B60T 8/44
[52] U.S. Cl. .................... 303/114; 303/119; 60/575; 60/578
[58] Field of Search ............... 303/114, 116, 119, 115, 303/100, 113, 91, 92, 10; 188/345; 60/574, 575, 578

[56] References Cited

U.S. PATENT DOCUMENTS

| | | | |
|---|---|---|---|
| 3,032,996 | 5/1962 | Foreman | 60/574 |
| 3,802,199 | 4/1974 | Hagberg | 60/574 |
| 4,035,034 | 7/1977 | Sekiguchi | 303/119 |
| 4,415,210 | 11/1983 | Belart et al. | 303/116 |
| 4,492,413 | 1/1985 | Belart et al. | 303/114 |

*Primary Examiner*—John W. Caldwell, Sr.
*Assistant Examiner*—Alvin Oberley
*Attorney, Agent, or Firm*—James B. Raden; William J. Michals

[57] ABSTRACT

A hydraulic brake system with slip control for automotive vehicles, comprises a master cylinder (2) pressurizable by a hydraulic power booster (1), in which system valve members (39, 40, 43, 44, 47) are inserted between the master cylinder (2) and the wheel brakes (45, 46, 41, 42) connected thereto which serve to remove pressure fluid from the wheel brakes (41, 42, 45, 46). Pressure fluid taken from the wheel brakes (41, 42, 45, 46) is replenished out of the pressure chamber (6) of the hydraulic power booster (1). A stroke limitation of the brake pedal (7) is effected during slip control. To shorten the braking pressure generator (1, 2) while utilizing the known pre-charging effect, a stepped piston is employed as master cylinder piston (4), wherein a piston step (15) with larger diameter confines a working chamber (16) of the master cylinder (2) and wherein an annular surface (18) between the piston steps (14, 15) confines an annular housing chamber (19) which latter is connectable to the working chamber (16) by way of a supply valve (31) governed by the pressure in the working chamber (16).

3 Claims, 1 Drawing Figure

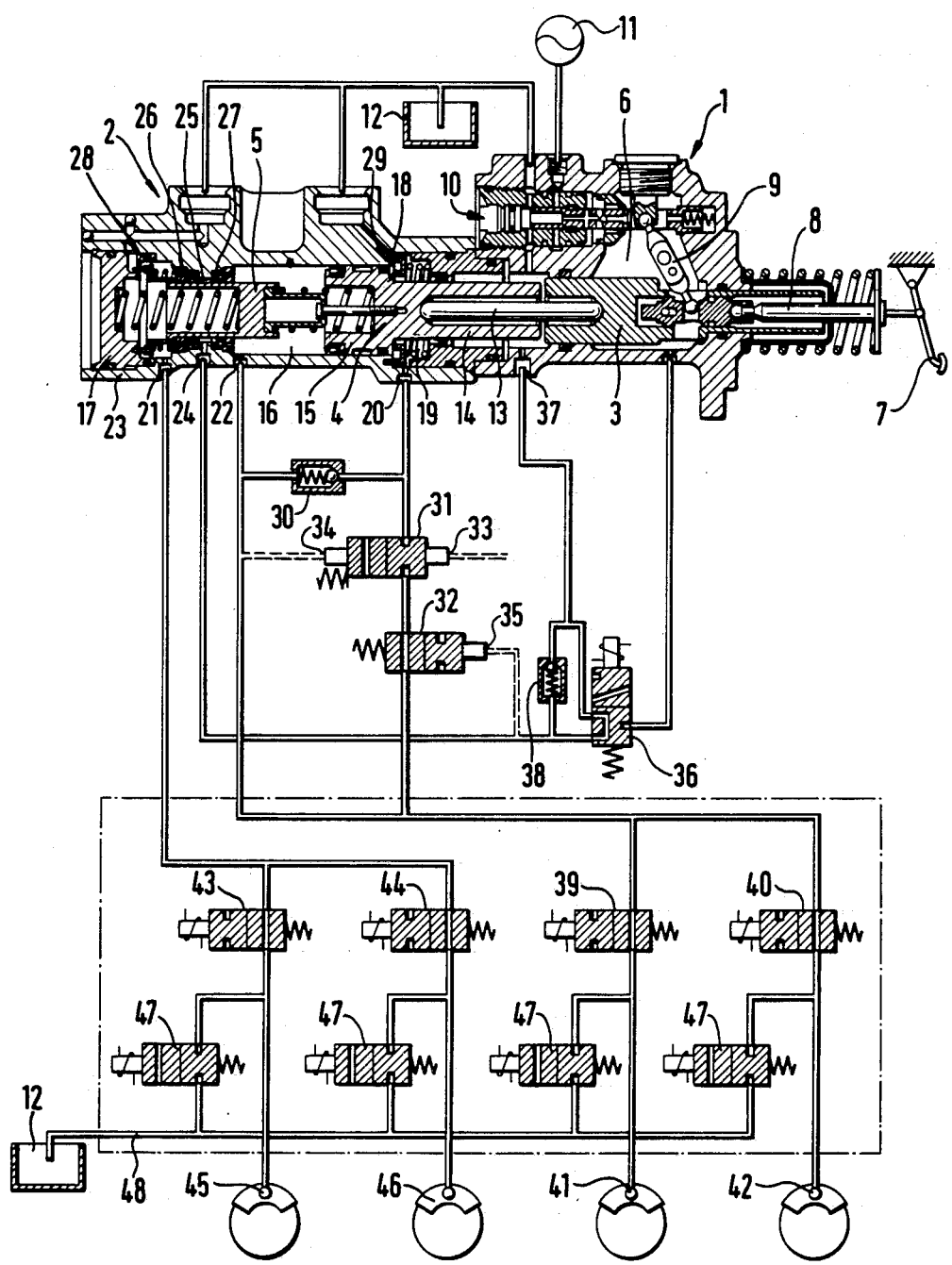

HYDRAULIC BRAKE SYSTEM WITH SLIP CONTROL

BACKGROUND OF THE INVENTION

The present invention relates to a hydraulic brake system with slip control, in particular for automotive vehicles, comprising a master cylinder pressurizable by a hydraulic power booster, in which system valve means are inserted between the master cylinder and the wheel brakes connected to the master cylinder which serve to remove pressure fluid from the wheel brakes, wherein the pressure fluid taken from the wheel brakes can be replenished out of the pressure chamber of the hydraulic power booster, and wherein a stroke limitation of the brake pedal is effected during slip control.

A hydraulic brake system incorporating the preceding features is known from German printed and published patent application No. 3040562. This known brake system comprises a hydraulic power booster which is furnished with the pressure of an auxiliary energy source. Through a brake valve actuatable by a pedal, a hydraulic pressure can be built up in the pressure chamber of the hydraulic power booster which is proportional to the actuating force applied on the brake pedal. In the presence of a minimum pressure of response in the pressure chamber of the hydraulic power booster, which is essentially defined by the friction caused by the seals, the booster piston will start to move in the actuating direction and thus displace at the same time one or several master cylinder pistons in the actuating direction. Said master cylinder pistons serve to confine working chambers of a master cylinder which are in hydraulic communication with an unpressurized supply reservoir in the brake's release position. When the master cylinder pistons have performed a predeterminable travel, the communication to the unpressurized supply reservoir will be interrupted by suitable valve means. Therefore, continued movement of the master cylinder pistons in the actuating direction results in pressurization of the master cylinder chambers. Said master cylinder chambers are in hydraulic communication with wheel brakes of an automotive vehicle.

Inserted into the connections between the working chambers of the tandem master cylinder and the wheel brakes connected thereto are first valve means which are normally in the opened position and which are switchable by a slip control electronics to assume a closed position in which the wheel brakes are isolated from the master cylinder. Assigned to the wheel brakes are further valve means which are normally closed and which, when driven appropriately by a slip control electronics, will deliver pressure fluid out of the wheel brakes to an unpressurized supply reservoir. As the volume of pressure fluid enclosed in the working chambers of the tandem master cylinder is limited, it is necessary that pressure medium removed from the wheel brakes will be replenished.

For this purpose, the prior art brake system is furnished with a change-over valve controllable by the slip control electronics, which valve changes over on commencement of a control action and connects the pressure chamber of the hydraulic power booster to the pedal-side end faces of the master cylinder pistons. Said master cylinder pistons are sleeve-sealed and contain openings between their end faces so that the pressure medium supplied out of the pressure chamber of the hydraulic power booster will propagate via the sealing sleeves of the master cylinder pistons into the working chambers of the tandem master cylinder and into the wheel brakes, respectively.

In this prior art brake system, it must be provided that during slip control that a minimum reserve remains enclosed in the working chambers of the tandem master cylinder. To this end, the braking pressure generator disposes of a positioning sleeve which receives the booster piston of the hydraulic power booster and which is pressurized in the brake's release direction on actuating of the change-over valve. Said positioning sleeve will move thereupon opposite to the actuating direction, and after having made a specific stroke, will get into abutment on an annular collar of the booster piston. On account of the ratios of surfaces predefined by construction, no further depression of the brake pedal is possible in this operating condition. Besides, it may happen that the brake pedal is reset slightly via the booster piston. As a whole, the prior art brake system is of complicated design and necessitates relatively larger overall dimensions.

It is, therefore, an object of the present invention to improve upon the prior art braking pressure generator with structurally simple means such that a reduction of the necessary overall dimensions will result by utilization of the pre-charging effect known per se.

SUMMARY OF THE INVENTION

This object is achieved according to the present invention in that a stepped piston is employed as master cylinder piston, wherein a piston step of larger diameter confines a working chamber of the master cylinder and wherein an annular surface between the piston steps confines an annular housing chamber which latter is connectable to the working chamber by way of a supply valve governed by the pressure in the working chamber. Hence, the supply valve serves to close the hydraulic connection between the working chamber of the master cylinder and the annular housing chamber in the brakes's release position as well as in the presence of small actuating forces. During brake actuation with the supply valve closed, the entire surface of the larger piston step of the stepped piston will be effective so that, with correspondingly small actuating travels resulting therefrom, a relatively larger quantity of pressure fluid is displaced out of the working chamber. The pressure fluid displaced out of the working chamber this way is fed to the brake system and finally fills said completely. After the brake system is filled completely with pressure fluid and the brake pads have been applied, a relatively steep pressure build-up takes place in the working chamber of the master cylinder, the said pressure propagating to the control port of the supply valve and ensuring that said supply valve assumes an opened position. Thus, the same amount of pressure will prevail in the annular housing chamber as in the working chamber of the master cylinder in the open-passage condition of the supply valve. From this results that the area participating now in the pressure generation in the working chamber corresponds to the cross-sectional surface of the smaller piston step. Advantageously, there is arranged in parallel to the supply valve a check valve which is adapted to open towards the working chamber and which prevents that pressure fluid volume is fed into the annular housing chamber in the pre-charging phase and ensures a fluid compensation in the annular housing chamber in the phase of brake release.

In a further embodiment of the present invention, a shut-off valve is connected in series to the supply valve, which first valve is actuatable slip-responsively to adopt a closed position. Normally, this shut-off valve assumes an opened position and will be switched to the closed position on recognition of critical slip values at one or at several of the vehicle wheels. Thereby, the annular housing chamber will be isolated hydraulically when brake slip control is peformed, irrespective of the position of the supply valve, so that the hydraulic pressure prevailing in the working chamber will not be able to displace the stepped piston in opposition to the actuating force in the brake's release direction. As it has to be assumed that during slip control the pressure in the working chamber is slightly higher than that in the annular housing chamber in consequence of the friction caused by the seals of the larger piston step, likewise the check valve in parallel to the supply valve will remain in a close position so that likewise this way no fluid compensation of the annular housing chamber is possible. Preferably, the shut-off valve is actuatable to assume the closed position by exposing it to the pressure of the pressure chamber. For this purpose, the hydraulic control line of the shut-off valve is connected to a line through which, during control, the working chamber is supplied with pressure fluid out of the pressure chamber of the hydraulic power booster.

Furthermore, it is advantageous to furnish a second control port of the supply valve with the pressure of an auxiliary energy source, the auxiliary pressure exerting a force on the supply valve when it is in its closed position. As can be appreciated from the foregoing an auxiliary energy source and a pressure accumulator, respectively, is used for actuation of the hydraulic power booster. It will be desirable on failure of this auxiliary energy source that the vehicle drive is able to produce a pressure as high as possible in the working chamber by applying relatively small actuating forces on the brake pedal. The actuating travel is of secondary meaning in this respect. Therefore, upon failure of the auxiliary energy source, the supply valve will be switched over to assume a stable opened position due to the absence of the auxiliary pressure at the corresponding control port, in which position the working chamber is in permanent communication with the annular housing chamber. As a result thereof, the pre-charging effect will not occur in any case upon failure of the auxiliary energy source.

BRIEF DESCRIPTION OF THE DRAWING

One embodiment of the present invention will be described in more detail hereinbelow with reference to the accompanying drawing in which the single FIGURE illustrates a principle view in partial cross section of a hydraulic brake system.

DETAILED DESCRIPTION

In the drawing, reference numeral 1 designates a hydraulic power booster which serves to pressurize a tandem master cylinder 2. Said hydraulic power booster 1 comprises a booster piston 3 which is located coaxially to the two master cylinder pistons 4, 5. The pedal-side end face of the booster piston 3 shows to a pressure chamber 6 and receives the end of the push rod 8 coupled to a brake pedal 7. Supported at the push rod 8 is the one end of a lever actuation 9, the other end of which abuts on a brake valve 10 of the hydraulic power booster 1. Via the push rod 8 coupled to the brake pedal 7 and the lever actuation 9, a hydraulic pressure can be built-up in the pressure chamber 6, of the hydraulic power booster 1 which is proportional to the actuating force applied on the brake pedal 7. Connected to said brake valve 10 is a hydropneumatic pressure accumulator 11, on the one hand, and an unpressurized supply reservior 12, on the other hand.

The side of the booster piston 3 remote from the brake pedal 7 is operatively connected in the actuating direction with the master cylinder piston 4 via a push rod 13. Said master cylinder piston 4 comprises a portion 14 of smaller diameter and a portion 15 with enlarged diameter. A first working chamber 16 is bounded by the end face of the piston portion 15. Exposed to the first working chamber 16 is furthermore the end face of the master cylinder piston 5 close to the pedal, while the end face of the master cylinder piston 5 remote from the pedal bounds a second working chamber 17.

The master cylinder piston 4 forms between the piston portions 14, 15 an annular surface 18 by which an annular housing chamber 19 is confined, a housing port 20 branching off from said annular housing chamber 19. Likewise, two housing ports 21, 22 branch off from the working chamber 16, 17 of the tandem master cylinder. The housing 23 of the tandem master cylinder is provided further with a housing port 24 which terminates into an annular chamber 25. Said annular chamber 25 is disposed in the portion of the cylinder bore of the tandem master cylinder in which the master cylinder piston 5 is guided, and is on both sides provided with sealing sleeves 26, 27 acting as check valves, through which sleeves pressure fluid can be supplied to the working chamber 16, 17 of the tandem master cylinder. In the brake's release position, both working chamber 16, 17 are connected via valves 28, 29 to the unpressurized supply reservoir 12. After the master cylinder pistons 4, 5 have performed a relatively small actuating travel, said valves 28, 29 will be closed, thus causing isolation of the working chamber 16, 17 from the unpressurized supply reservoir 12.

Interposed between the housing ports 22, 20 of the tandem master cylinder 2 is a check valve 30 which enables a fluid flow from the annular housing chamber 19 to the working chamber 16 exclusively. Located in parallel to the check valve 30 is the series connection of a supply valve 31 and a shut-off valve 32. The supply valve 31 is designed as a two-way/two-position valve and normally is in its closed position, while a first control port 33 of the supply valve 31 is acted upon by the pressure prevailing in the pressure accumulator 11. A second control port 34 of the supply valve 31 is connected to the housing port 22 and to the first working chamber 16, respectively.

The shut-off valve connected in series to the supply valve 31 is likewise designed as two-way/two-position valve and is normally in its opened position. The shut-off valve 32, too, is pressure-responsively switchable via a control port 35. Finally, a main valve 36 which is designed as three-way/two-position valve is connected to the pressure chamber 6 of the hydraulic power booster and is actuatable by a slip control electronics not illustrated. In the brake's release position to be taken from the drawing, the main valve 36 adopts a position in which the pressure chamber 6 of the hydraulic power booster 1 is isolated; besides, the housing port 24 is connected to a housing port 37, the said housing port 37 being in turn in communication with the unpressurized supply reservoir 12. In addition thereto, a check valve 38 is interposed between the housing ports 37, 24 which is adapted to open in the presence of a pressure difference from the housing port 37 to the housing port 24.

Wheel brakes 41, 42 are connected via normally opened inlet valve 39, 40 to the first working chamber of the tandem master cylinder and the housing port 22, respectively. Said inlet valves 39, 40 are controllable electromagnetically by the non-illustrated slip control electronics. In the same manner, wheel brakes 45, 46 are connected to the second working chamber 17 of the tandem master cylinder 2 via inlet valves 43, 44. Likewise the inlet valves 43, 44 are normally in their opened position and are switchable to assume a closed position by the slip control electronics. An outlet valve 47 is arranged at each wheel brake, the said outlet valves 47 being normally in a closed position and being actuatable by the slip control electronics to assume an opened position, so that pressure fluid can be taken from the wheel brakes 41, 42, 45, 46 when the inlet valves 31, 40, 43 44 are closed, which fluid can be returned to the unpressurized supply reservoir 12 via one joint return line 48.

The mode of operation of the brake system described will be referred to in more detail hereinbelow starting from the condition of brake release discernible from the drawing. In the condition of brake release, a hydraulic connection is established via the brake valve 10 between the pressure chamber 6 of the hydraulic power booster 1 and the unpressurized supply reservoir 12.

The working chambers 16, 17 of the tandem master cylinder and the wheel brakes 41, 42, 45, 46 connected thereto are unpressurized, since there is hydraulic communication between the working chambers 16, 17 and the unpressurized supply reservoir 12 via the valves 28, 29. It shall be presupposed furthermore that the pressure accumulator 11 is in a charging condition sufficient to boost the brake force; therefore, the pressure of the pressure accumulator 11 prevails likewise at the control port 33 of the supply valve 31 and keeps the supply valve 31 in the position to be taken from the drawing.

When an actuating force is exerted on the brake pedal 7, a pressure proportional to this actuating force will develop in the pressure chamber 6 of the hydraulic power booster 1. After the pressure in the pressure chamber 6 of the hydraulic power booster 1 has exceeded a minimum pressure of response which is essentially determined by the friction effect caused by the seals, the booster piston 3 will displace in the actuating direction, a like displacement of the booster piston 3 being first transmitted via the push rod 13 onto the master cylinder piston 4 which likewise displaces in the acutuating direction. After a small displacement travel of the master cylinder piston 4, the valve 29 will close, thereby interrupting the hydraulic connection between the first working chamber 16 of the tandem master cylinder and the unpressurized supply reservoir 12. Continued displacement of the master cylinder piston 4 will have as a result that hydraulic pressure is built up in the first working chamber 16 which, on the one hand, propagates through the opened inlet valves 39, 40 to the wheel brakes 41, 42 and, on the other hand, causes the master cylinder piston 5 to displace in the actuating direction, whereby also the valve 28 will close, will interrupt the connection between the working chamber 17 and the unpressurized supply reservoir 12 and will then generate a pressure in the working chamber 17 which propagates through the opened inlet valves 43, 44 to the wheel brakes 45, 46. In this arrangement, the entire end face of the piston portion 15 will be effective in the initial phase of braking until the brake system is filled up, since the supply valve 31 is in a switching position, in which the annular housing chamber 19 is isolated hydraulically from the first working chamber 16. Moreover, the check valve 30 prevents that pressure fluid escapes from the first working chamber 16 into the annular housing chamber 19. After the pre-charging of the entire brake system and the development of a predeterminable minimum pressure in the working chamber 16 of the tandem master cylinder 2, pressurization of the control port 34 will cause the supply valve 31 to assume an opened position, in which there is hydraulic communication between the annular housing chamber 19 and the first working chamber 16 of the tandem master cylinder via the still opened shut-off valve 32. Now, approximately the same pressure are prevailing in the first working chamber 16 and in the annular chamber 19 so that further pressure build-up in the working chambers 16, 17 of the tandem master cylinder 2 will be defined exclusively by the effective surface of the smaller-diameter piston portion 14.

It shall be assumed that a critical slip value occurs at one or at several of the vehicle wheels allocated to the wheel brakes, 41, 42, 45, 46. Such behavior of the vehicle wheels will be sensed by the slip control electronics not shown, and a corresponding switching signal will be issued to the main valve 36 on recognition of like operating conditions. In response thereto, the main valve 36 will change over and establish a connection between the pressure chamber 6 of the hydraulic power booster 1 and the housing port 24. Furthermore, the pressure prevailing in the pressure chamber 6 of the hydraulic power booster will propagate to the control port 35 of the shut-off valve 32 and cause the shut-off valve 32 to assume the closed position. Thus, the pressure fluid is enclosed in the annular housing chamber 19 irrespective of the position of the supply valve 31.

Equal hydraulic pressure now prevail in the working chambers 16, 17 of the tandem master cylinder 2 and in the pressure chamber 6 of the hydraulic power booster 1. Thus, a resetting force is exerted on the end face of the larger piston step 15 of the master cylinder 4, which end face is close to the working chamber 16. However, a resetting movement does not take place, since the volume enclosed in the annular housing chamber 19 acts as an obstruction. The check valve 30 is required to dispose of an opening pressure of several bar with a view to ensuring that likewise pressure peaks are able to reset the piston 4 via the check valve.

It shall be assumed for instance that first the vehicle wheel allocated to the wheel brake 41 shows an inadmissibly high slip value. Thereupon, the slip control electronics will cause the inlet valve 39 to assume the closed position, as a result whereof the hydraulic connection between the working chamber 16 and the wheel brake 41 is interrupted. In case a like phase of maintaining the pressure constant in the wheel brake 41 will not suffice to bring about re-acceleration of the respective vehicle wheel, likewise the outlet valve 47 allocated to the wheel brake 41 will be changed over, and pressure fluid will be removed from the wheel brake 41 and the effective braking pressure will be reduced. The valves 39, 47 assigned to the wheel brake 41 will switch alternately in the following, until the respective vehicle wheel will have re-accelerated in a sufficient manner. The pressure fluid which has been taken from the wheel brake 41 for this purpose will be replenished out of the first working chamber 16 of the tandem master cylinder, while the pressure fluid loss in the working chamber 16 will be replenished via the sealing sleeve 27 out of the pressure chamber 6 of the hydraulic power booster.

In the brake's release position, the sequences of motion described will be reversed, until the active position of the brake system to be seen from the drawing will have been re-established.

If, in the brake system described, the charging condition of the hydropneumatic pressure accumulator 11 is not sufficient, the pressure prevailing at the control port 33 of the supply valve 31 will not be enough to switch the supply valve 31 into the closed position. Hence, there is a permanent connection between the housing ports 20, 22 and, respectively, between the annular housing chamber 19 and the working chamber 16 of the tandem master cylinder 2 so that the described pre-charging effect of the brake system ceases to exist. Thereby, the vehicle driver is enabled to pressurize the working chambers 16, 17 and, respectively, the wheel brakes 45, 46, 41, 42 connected to the working chambers with the aid of a relatively small actuating force. Due to the cessation of the pre-charging effect, admittedly, there ensues an enlarged pedal travel compared to the brake actuation when the pressure accumulator 11 is intact, but it is safeguarded that a pressure develops in the working chambers 16, 17 of the tandem master cylinder 2 which pressure ensures that prescribed minimum deceleration of the automotive vehicle.

What is claimed is:

1. A hydraulic brake system with slip control for automotive vehicles having wheel brakes, comprising a master cylinder pressurizable by a hydraulic power booster having a pressure chamber connected to the wheel brakes, in which system valve means are inserted between the master cylinder and the wheel brakes connected to the master cylinder which serve to remove pressure fluid from the wheel brakes, means for replenishing the pressure fluid taken from the wheel brakes out of the pressure chamber of the hydraulic power booster, and means for providing a stroke limitation of the brake pedal during slip control including a stepped piston employed as master cylinder piston (4), wherein a piston step (15) of larger diameter confines a working chamber (16) of the master cylinder (2) and wherein an annular surface (18) between the piston steps (14, 15) confines an annular housing chamber (19) which latter is connectable to the working chamber (16) by way of a normally closed supply valve (31) connected therebetween and having a control port (34) connected to the working chamber (16) and which is responsive to the pressure in the working chamber (16) to open said supply valve;

wherein a check valve (30) which is adapted to open towards the working chamber (16) is arranged in parallel to the supply valve (31); and wherein a normally open shut-off valve (32) is serially connected with said supply valve (31) between the housing chamber (19) and the working chamber (16) and which includes a control port (35) which is actuatable in response to valve means (36) controlled by slip control electronics to assume a closed position.

2. A hydraulic brake system as claimed in claim 1, wherein the control port (35) of shut-off valve (32) is connected to the pressure chamber (6) so that the shut-off valve (32) is actuatable to assume the closed position by pressurization with the pressure of the pressure chamber (6) controlled by said valve means (36).

3. A hydraulic brake system as claimed in claim 1, wherein the supply valve (31) is responsive to the pressure of an auxiliary energy source (11), the auxiliary pressure exerting a force on the supply valve (31) when said supply valve (31) is in its closed position.

* * * * *